US012623381B2

(12) United States Patent
Horiuchi

(10) Patent No.: US 12,623,381 B2
(45) Date of Patent: May 12, 2026

(54) INJECTION MOLDING METHOD FOR RESIN MOLDED PRODUCT AND INJECTION MOLDING APPARATUS

(71) Applicant: HONDA MOTOR CO., LTD., Tokyo (JP)

(72) Inventor: Yuhei Horiuchi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 122 days.

(21) Appl. No.: 18/236,079

(22) Filed: Aug. 21, 2023

(65) Prior Publication Data

US 2024/0066770 A1 Feb. 29, 2024

(30) Foreign Application Priority Data

Aug. 25, 2022 (JP) ................................. 2022-134063

(51) Int. Cl.
*B29C 45/33* (2006.01)
*B29C 45/16* (2006.01)
*B29C 45/26* (2006.01)
*B29L 23/00* (2006.01)

(52) U.S. Cl.
CPC ...... B29C 45/1635 (2013.01); B29C 45/2616 (2013.01); B29C 45/33 (2013.01); *B29L 2023/22* (2013.01)

(58) Field of Classification Search
CPC ... B29C 45/261; B29C 45/1635; B29C 45/33; B29C 45/162; B29C 45/14467
See application file for complete search history.

(56) References Cited

U.S. PATENT DOCUMENTS

| | | | | |
|---|---|---|---|---|
| 2008/0136067 A1* | 6/2008 | Scott | ..................... | F16L 15/008 |
| | | | | 425/522 |
| 2012/0321742 A1* | 12/2012 | Wang | ...................... | B29C 45/33 |
| | | | | 425/577 |
| 2020/0078996 A1* | 3/2020 | Kämereit | ................ | B29C 45/36 |

FOREIGN PATENT DOCUMENTS

JP H01-209113 A 8/1989

* cited by examiner

*Primary Examiner* — Jacob T Minskey
*Assistant Examiner* — Debjani Roy
(74) *Attorney, Agent, or Firm* — Carrier, Shende & Associates P.C.; Joseph P. Carrier; Fulchand P. Shende

(57) ABSTRACT

An injection molding method for a resin molded product includes a first molding step of molding an intermediate molded body with first and second main molds and a first slide mold that is closed in an axial direction of the first and second main molds. The injection molding method for the resin molded product further includes a detachment step of detaching the first slide mold from the intermediate molder body and a second molding step of molding a second annular wall portion on the intermediate molded body using a second slide mold that is closed along the axial direction against a tube end surface of the intermediate molded body and first and second core molds that is closed against the intermediate molded body in a direction orthogonal to the axis.

3 Claims, 9 Drawing Sheets

INJECTION MOLDING METHOD FOR RESIN MOLDED PRODUCT AND INJECTION MOLDING APPARATUS

CROSS-REFERENCE TO RELATED APPLICATIONS

This application is based upon and claims the benefit of priority from Japanese Patent Application No. 2022-134063 filed on Aug. 25, 2022, the contents of which are incorporated herein by reference.

BACKGROUND OF THE INVENTION

Field of the Invention

The present invention relates to an injection molding method for a resin molded product and an injection molding apparatus.

Description of the Related Art

JP H01-209113 A discloses a manufacturing method for an air-tight member attached to an outer circumference of a pipe. The air-tight member is formed into an annular shape through injection molding by filling the inside of a closed upper mold and lower mold with resin material. An annular groove portion is formed in an outer circumferential portion of the air-tight member. By attaching the air-tight member to a hole portion of a dashboard, an air-tight state is maintained between the inside and outside of the dashboard.

SUMMARY OF THE INVENTION

In the air-tight member formed by injection molding, a parting line is formed at a parting location between the upper mold and the lower mold. The parting line is formed as a straight line along the axial direction on the outer circumferential surface of the air-tight member. Such a parting line is also formed in the annular groove portion. When the air-tight member is attached to the hole portion of the dashboard, there is a concern that a gap occurs between the dashboard and the outer circumferential surface of the air-tight member due to the parting line formed along the axial direction in the annular groove portion, thereby reducing the air-tight property. There is an idea to remove the parting line from the outer circumferential surface via additional machining such as grinding in order to maintain the air-tight property, but such a machining process is complicated and would increase the manufacturing cost.

An aspect of the present invention is an injection molding method for a resin molded product, for forming a tubular resin molded product by injection molding, wherein: the resin molded product includes: a cylindrical portion that extends along an axial direction of the resin molded product and includes a tube end surface that is an end surface at at least one end side in the axial direction; a first annular wall portion that protrudes radially outward from an outer circumferential surface of the cylindrical portion at at least the one end side of the cylindrical portion, and includes a side wall surface facing outward in the axial direction; a second annular wall portion that protrudes radially outward from the outer circumferential surface of the cylindrical portion at at least the one end side of the cylindrical portion, and is arranged distanced outward in the axial direction from the first annular wall portion; and an annular groove portion formed between the first annular wall portion and the second annular wall portion. The cylindrical portion includes a tube body forming part of the cylindrical portion that extends from the side wall surface of the first annular wall portion to at least a center of the cylindrical portion in the axial direction, and a tube end portion that extends from the side wall surface to the tube end surface of the cylindrical portion and whose outer circumferential surface forms part of the annular groove portion. The injection molding method includes: a first molding step of molding an intermediate molded body that includes the tube body and the first annular wall portion of the resin molded product, using first and second main molds that are closed together along a direction orthogonal to an axis of the cylindrical portion and a first slide mold that is closed against at least one end surface of the first and second main molds along an axial direction of the cylindrical portion; a detachment step of, after the molding of the intermediate molded body, detaching the first slide mold from the intermediate molded body along the axial direction of the cylindrical portion; and a second molding step of molding the second annular wall portion on the outer circumferential surface of the cylindrical portion, using a second slide mold that is closed, along the axial direction, against the tube end surface of the cylindrical portion of the intermediate molded body and first and second core molds that are closed in a direction orthogonal to the axis of the cylindrical portion and disposed adjacent to the side wall surface.

According to the present invention, after forming the intermediate molded body that has the first annular wall portion and the tube body of the cylindrical portion in the first molding step for injection molding of the resin molded product, the second slide molds are closed onto the intermediate molded body from the axial direction to form the second annular wall portion on the outer circumferential surface of the cylindrical portion in the second molding step. Due to this, the formation of a mold parting line extending in the axial direction, due to injection molding, on the outer circumferential surface of the annular groove portion between the first annular wall portion and the second annular wall portion in the resin molded product is prevented. Therefore, after the resin molded product has been formed, there is no need to remove the mold parting line of the annular groove portion through additional machining, and so it is possible to reduce the number of manufacturing steps and the manufacturing cost.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 2 is an external planar view of the resin molded product obtained using the injection molding apparatus of FIG. 1;

FIG. 3 is a schematic configurational diagram showing a primary mold of the injection molding apparatus of FIG. 1;

FIG. 5 is a cross-sectional view taken along line V-V of FIG. 4;

DETAILED DESCRIPTION OF THE INVENTION

Figure 1:
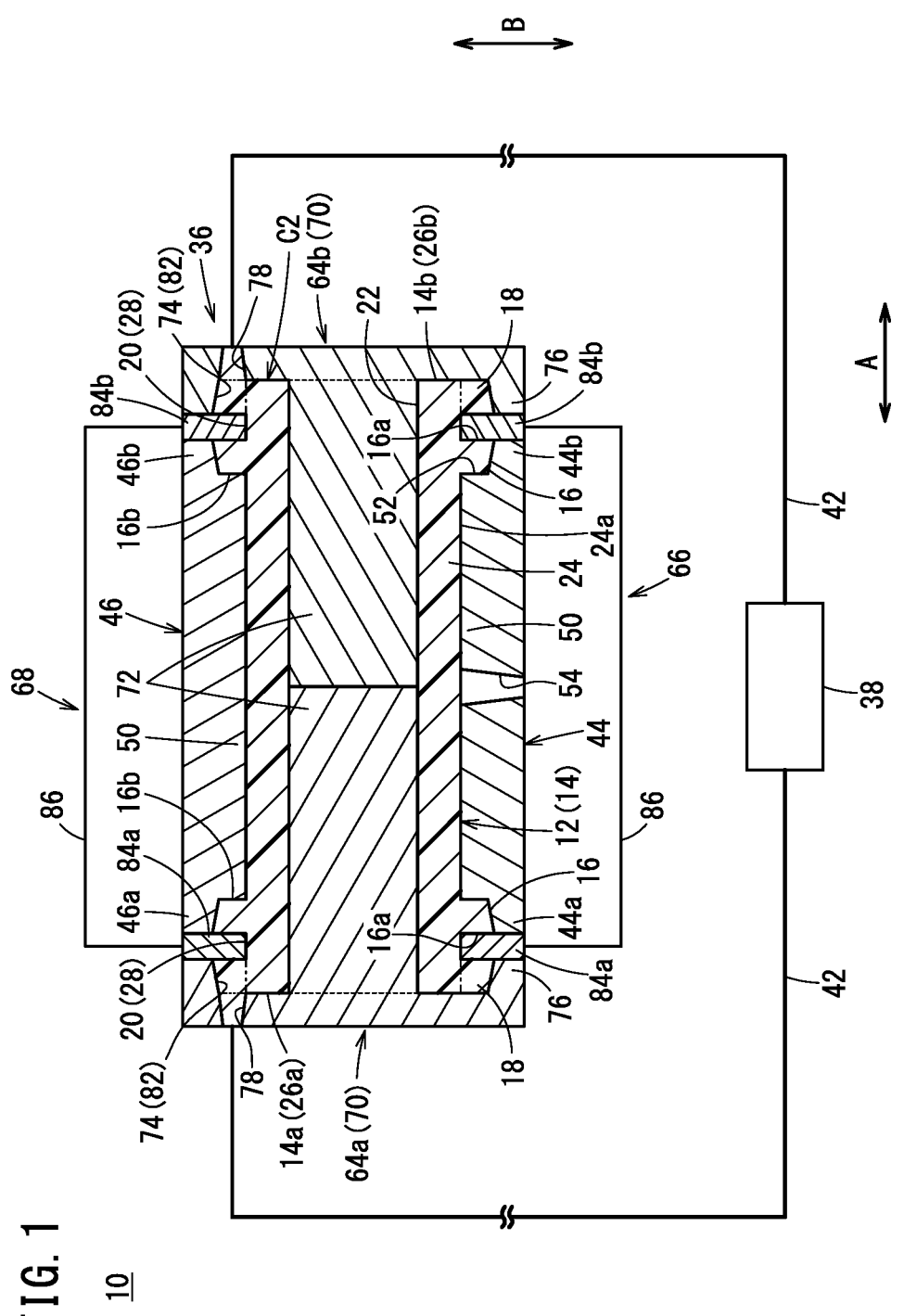
FIG. 1 is a schematic configurational diagram showing an injection molding apparatus for injection molding of a resin molded product according to an embodiment of the present invention.

As shown in FIG. 1, an injection molding apparatus 10 according to the present embodiment forms a tubular resin molded product 12 through injection molding.

First, the resin molded product 12 that is obtained by injection molding performed by the injection molding apparatus will be described, while referencing FIGS. 1 and 2.

The resin molded product 12 is a tubular body that is formed so as to have a linear shape along an axial direction (arrow A direction). The resin molded product 12 includes a cylindrical portion 14, first annular wall portions 16, second annular wall portions 18, and annular groove portions 20.

The cylindrical portion 14 is formed so as to have a circular annular shape having a constant radius along the axial direction. The cylindrical portion 14 includes tube end surfaces 14a and 14b respectively at one end side and the other end side in the axial direction. The tube end surfaces 14a and 14b are end surfaces of the cylindrical portion 14 at the one end side and other end side. The inside of the cylindrical portion 14 includes a through-hole 22 formed along the axial direction (arrow A direction). The through-hole 22 opens at each of the tube end surfaces 14a and 14b of the cylindrical portion 14.

The cylindrical portion 14 includes a tube body 24 and a pair of tube end portions 26a and 26b. The tube body 24 extends from the center of the cylindrical portion 14 in the axial direction to a side wall surface 16a of each first annular wall portion 16 described further below. The tube end portion 26a is arranged on the tube end surface 14a side of the tube body 24. The tube end portion 26a extends from the side wall surface 16a of one of the first annular wall portions 16 to the tube end surface 14a of the tube body 24. The tube end portion 26b is arranged on the tube end surface 14b side of the tube body 24. The tube end portion 26b extends from the side wall surface 16a of the other first annular wall portion 16 to the tube end surface 14b of the tube body 24. The outer circumferential surfaces 28 of the tube end portions 26a and 26b form part of the annular groove portions 20.

The first and second annular wall portions 16 and 18 are arranged at each of the one end side and the other end side, in the axial direction, of the cylindrical portion 14. The first and second annular wall portions 16 and 18 have annular shapes protruding radially outward from the outer circumferential surfaces 24a and 28 of the cylindrical portion 14. The first annular wall portion 16 and the second annular wall portion 18 are distanced from each other in the axial direction of the cylindrical portion 14 (arrow A direction), and face each other.

The first annular wall portion 16 is arranged on the center side in the axial direction relative to each of the tube end surfaces 14a and 14b of the cylindrical portion 14. The first annular wall portions 16 are arranged on the outer circumferential surface 24a of the tube body 24 in the cylindrical portion 14.

Each first annular wall portion 16 includes the side wall surface 16a that faces outward in the axial direction of the cylindrical portion 14. The side wall surface 16a is a flat surface that is substantially orthogonal to the axial line of the cylindrical portion 14. The side wall surface 16a faces the second annular wall portion 18. The first annular wall portion 16 includes a wall surface 16b that faces toward the center of the cylindrical portion 14 in the axial direction. The side wall surface 16a and the wall surface 16b are distanced from each other in the axial direction of the cylindrical portion 14 (arrow A direction) and are substantially parallel to each other.

The second annular wall portion 18 is arranged on the outer circumferential surfaces 28 of each of the tube end portions 26a and 26b in the cylindrical portion 14. The second annular wall portion 18 is arranged so as to be distanced outward in the axial direction from the first annular wall portion 16. The second annular wall portion 18 includes an inner wall surface 18a. The inner wall surface 18a faces the side wall surface 16a of the first annular wall portion 16. The first annular wall portion 16 and the second annular wall portion 18 are parallel to each other. The height of the first annular wall portion 16 and the height of the second annular wall portion 18, relative to the outer circumferential surfaces 24a and 28 of the cylindrical portion 14, are substantially the same. The second annular wall portion 18 includes an axial end surface 18b that faces outward in the axial direction of the cylindrical portion 14. The axial end surface 18b and the inner wall surface 18a are substantially parallel to each other.

The annular groove portion 20 is arranged between the first annular wall portion 16 and the second annular wall portion 18. The annular groove portions 20 are spaces surrounded by the outer circumferential surfaces 28 of the tube end portions 26a and 26b; the side wall surfaces 16a of the first annular wall portions 16; and the inner wall surfaces 18a of the second annular wall portions 18. An annular seal member (see FIG. 2), for example, is attachable to the annular groove portion 20. The seal member 30 contacts the bottom surface of the annular groove portion 20 (outer circumferential surfaces 28 of the tube end portions 26a and 26b).

The following describes the injection molding apparatus 10 that performs the injection molding of the resin molded product 12.

As shown in FIG. 1, the injection molding apparatus 10 includes a primary mold 34 (see FIG. 3) having a first cavity C1 therein, a secondary mold 36 having a second cavity C2 therein, and a resin supplying apparatus 38. The injection molding apparatus 10 forms, by molding, an intermediate molded body 40 serving as the base for the resin molded product 12 through primary molding (first molding step) with the primary mold 34. The injection molding apparatus 10 forms the resin molded product 12 (see FIG. 1) using the intermediate molded body 40 (see FIG. 4) as a base, through secondary molding (second molding step) using the secondary mold 36.

Figure 3:
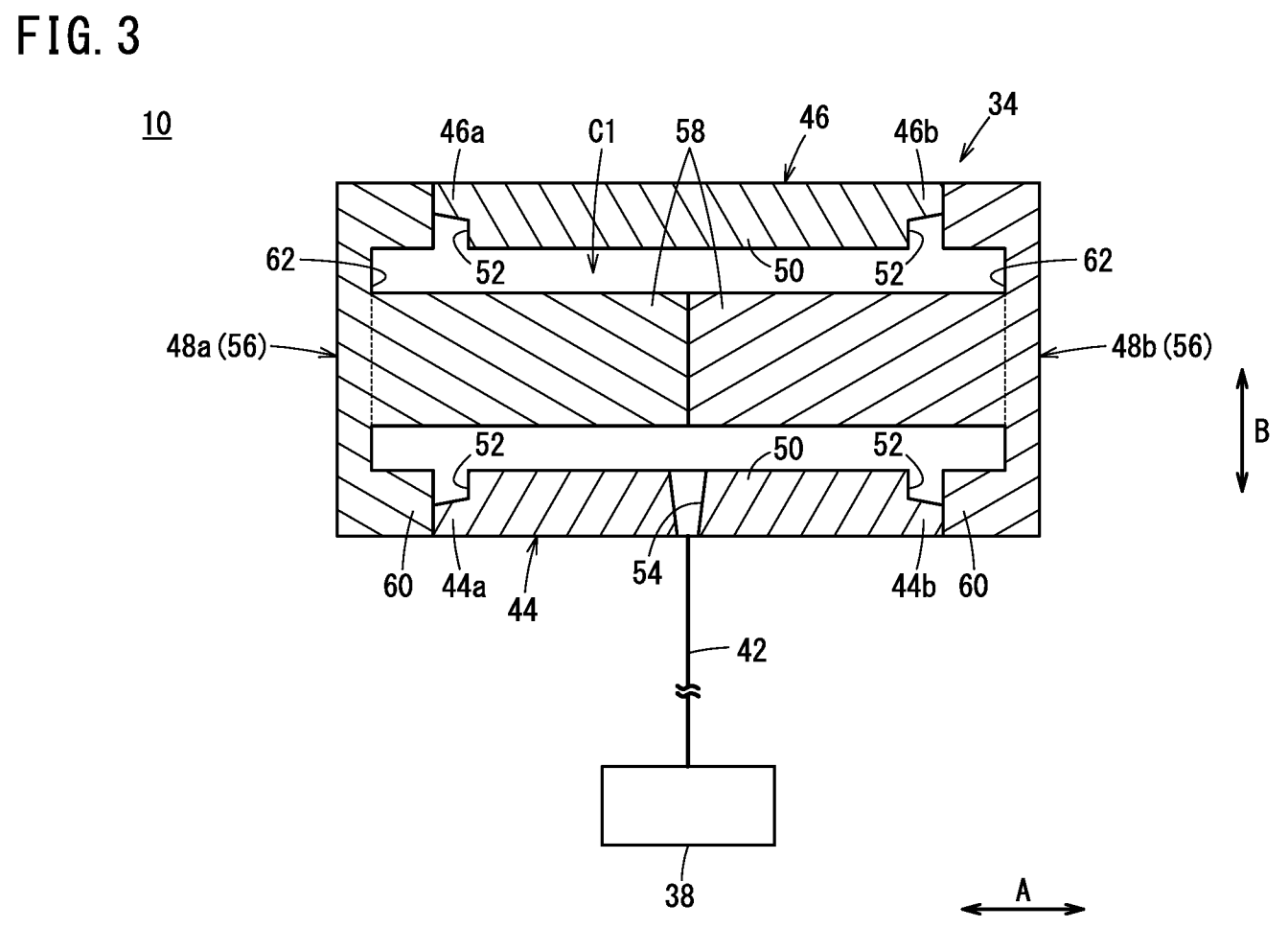

As shown in FIG. 3, the primary mold 34 and the resin supplying apparatus 38 are connected to each other via a pipe 42. The resin supplying apparatus 38 can supply the primary mold 34 with heated and melted resin R, through the pipe 42 (see FIG. 4). As shown in FIG. 1, the secondary mold 36 and the resin supplying apparatus 38 are connected to each other via a pipe 42. The resin supplying apparatus 38 can supply the secondary mold 36 with heated and melted resin R, through the pipe 42. The resin R can be selectively supplied from the resin supplying apparatus 38 to one of the primary mold 34 and the secondary mold 36.

Figure 4:
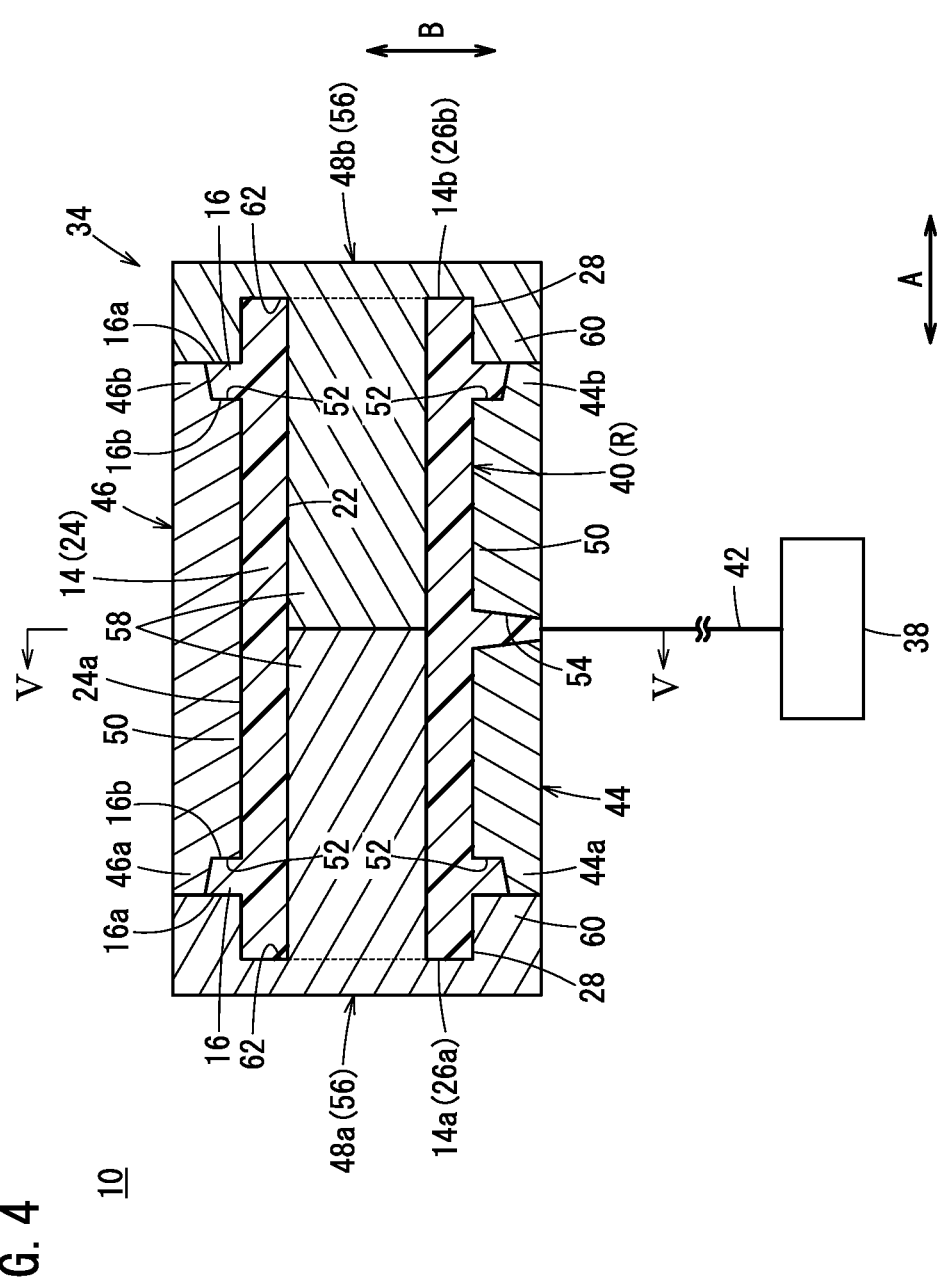
FIG. 4 is a configurational diagram showing a first molding step in which a first cavity of the injection molding apparatus of FIG. 3 is filled with resin.

As shown in FIGS. 3 and 4, the primary mold 34 includes first and second main molds 44 and 46 and a pair of first slide molds 48a and 48b.

Figure 5:
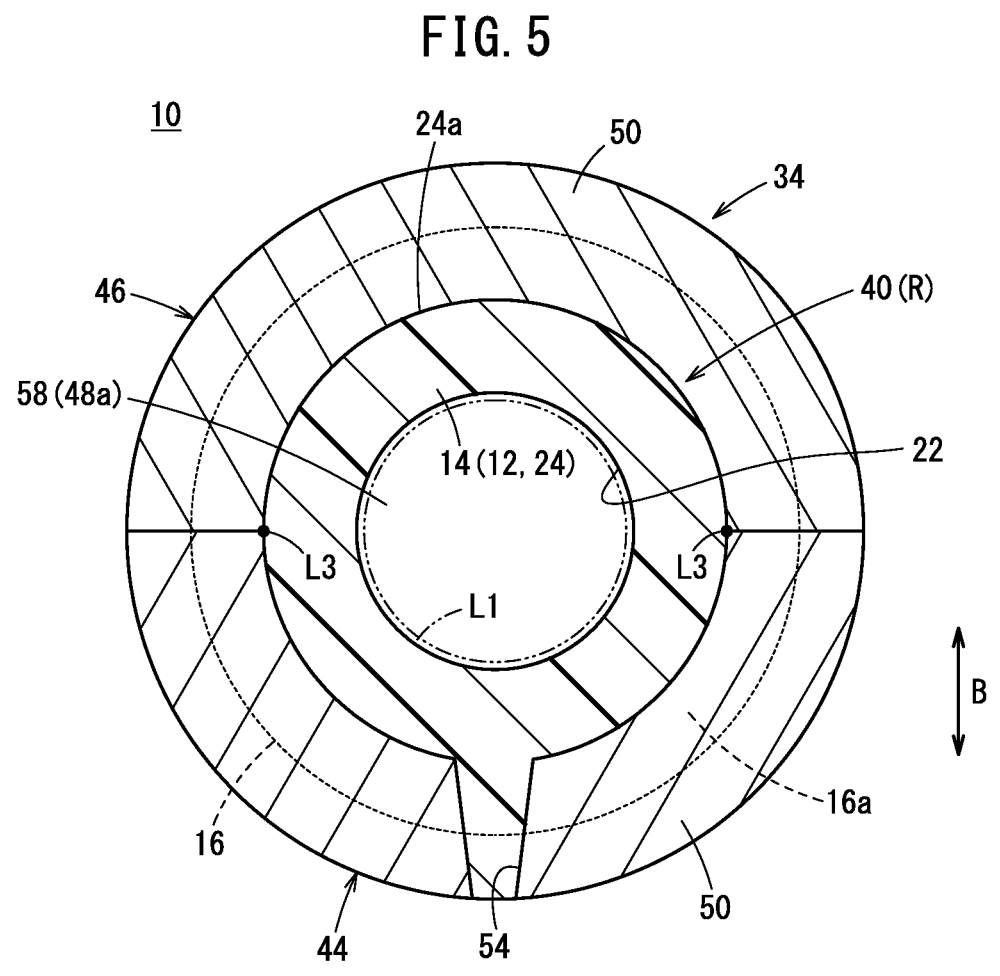

The first and second main molds 44 and 46 extend along the axial direction (arrow A direction). The first and second main molds 44 and 46 have semicircular cross-sectional shapes, when viewed from the axial direction of the first and second main molds 44 and 46 shown in FIG. 5. The first and second main molds 44 and 46 have substantially symmetrical shapes and face each other in a manner to sandwich the axis of the intermediate molded body 40 and resin molded product 12. The first main mold 44 and the second main mold 46 are arranged symmetrically in a manner to sandwich the axis of the intermediate molded body 40 and resin molded product 12.

The first main mold 44 and the second main mold 46 are arranged in a manner to be capable of moving toward and away from each other, due to a displacement mechanism (not shown), while sandwiching the intermediate molded body 40 and resin molded product 12. The movement directions of the first and second main molds 44 and 46 are directions (arrow B directions) orthogonal to the axial line of the first and second main molds 44 and 46. The movement directions of the first and second main molds 44 and 46 may be directions orthogonal to the arrow A direction and arrow B direction.

The both end portions of the first main mold 44 in the axial direction respectively include mold end portions 44a and 44b. The mold end portions 44a and 44b have surfaces that are orthogonal to the axial direction of the first main mold 44. The both end portions of the second main mold 46 in the axial direction respectively include mold end portions 46a and 46b. The mold end portions 46a and 46b have surfaces that are orthogonal to the axial direction of the second main mold 46. The inner circumferential surfaces of the first and second main molds 44 and 46 form a part of the first cavity C1.

The inner circumferential surfaces of the first and second main molds 44 and 46 include a cylinder molding portion 50 and a pair of first wall molding portions 52.

The cylinder molding portion 50 extends along the axial direction of the first and second main molds 44 and 46. The outer circumferential surface 24a of the tube body 24 of the cylindrical portion 14 is formed by the cylinder molding portion 50.

The first wall molding portions 52 are arranged respectively at the ends of the cylinder molding portion 50 in the axial direction. Each first wall molding portion 52 is depressed radially outward relative to the cylinder molding portion 50. The first wall molding portions 52 open respectively in the mold end portions 44a and 44b of the first main mold 44 and the mold end portions 46a and 46b of the second main mold 46. The inner circumferential surfaces of the first wall molding portions 52 are arranged radially outward from the cylinder molding portion 50. The inner circumferential surfaces of the first wall molding portions 52 are inclined surfaces that are inclined radially outward toward the tube end surfaces 14a and 14b of the first and second main molds 44 and 46. The outer circumferential surface of the first annular wall portion 16 and the wall surface 16b of the first annular wall portion 16, which connects the outer circumferential surface 24a of the tube body 24 and the outer circumferential surface of the first annular wall portion 16, are formed by the first wall molding portion 52.

The first main mold 44 includes a first runner 54 through which the melted resin R is supplied. The first runner 54 is arranged at the center of the first main mold 44 in the axial direction, and is connected to the resin supplying apparatus 38 via the pipe 42. The inside of the first cavity C1 including the first main mold 44 is filled with the resin R, by supplying the melted resin R from the resin supplying apparatus 38 to the first runner 54 (see FIG. 4). The first runner 54 may be arranged in the second main mold 46, or a first runner 54 may be arranged in each of the first and second main molds 44 and 46.

The first slide mold 48a faces one mold end portion 44a of the first main mold 44 and one mold end portion 46a of the second main mold 46. The first slide mold 48a is closed against the mold end portions 44a and 46a of the first and second main molds 44 and 46, along the axial direction of the cylindrical portion 14 of the intermediate molded body 40. The first slide mold 48b faces the other mold end portion 44b of the first main mold 44 and the other mold end portion 46b of the second main mold 46. The slide mold 48b is closed against the mold end portions 44b and 46b of the first and second main molds 44 and 46, along the axial direction of the cylindrical portion 14 of the intermediate molded body 40. The first slide molds 48a and 48b form the tube end portions 26a and 26b of the cylindrical portion 14, the inner circumferential surface of the tube body 24, and the side wall surfaces 16a of the first annular wall portions 16, in the intermediate molded body 40.

The first slide molds 48a and 48b each include a first cover portion 56 and a first shaft portion 58 that protrudes from the first cover portion 56. The first cover portions 56 are shaped as circular plates. The first cover portions 56 are arranged to cover the mold end portions 44a and 46a and the mold end portions 44b and 46b of the first and second main molds 44 and 46. The diameter of each first cover portion 56 is substantially the same as the diameter of a shape formed by combining the first and second main molds 44 and 46 together in the radial direction.

The first cover portions 56 include respective first cover end portions 60 that face, respectively, the mold end portions 44a, 46a and the mold end portions 44b, 46b, of the first and second main molds 44, 46. Each first cover end portion 60 is annular and forms an outer edge portion of the first cover portion 56. The first cover end portion 60 has a flat surface that is orthogonal to the axial line of the first cover portion 56. When the first and second main molds 44 and 46 and the first slide molds 48a and 48b are closed, the first annular wall portions 16 are formed respectively between one first cover end portion 60 and the mold end portions 44a and 46a of the first and second main molds 44 and 46 and between the other first cover end portion 60 and the mold end portions 44b and 46b. The first cover end portions 60 form the side wall surfaces 16a of the first annular wall portions 16.

The first shaft portion 58 is arranged so as to be centered on the axis of the first cover portion 56. The first shaft portion 58 protrudes from the first cover end portion 60 along the axis. The cross-sectional shape of the first shaft portion 58 is circular, as seen from the axial direction of the first slide molds 48a and 48b (see FIG. 5). The diameter of the first shaft portion 58 corresponds to the diameter of the through-hole 22 of the resin molded product 12. The first shaft portion 58 forms the inner circumferential surface of the cylindrical portion 14 in the intermediate molded body 40.

An annular first recessed portion 62 is formed between the inner circumferential surface of the first cover end portion 60 and the first shaft portion 58. The first recessed portion 62 is depressed in the axial direction from the end surface of the first cover end portion 60. When performing the primary molding with the primary mold 34, the tube end portions 26a and 26b of the cylindrical portion 14 are molded by the first recessed portions 62.

When performing the primary molding with the primary mold 34 shown in FIG. 3, one first slide mold 48a of the first slide molds is assembled together with one set of the mold end portions 44a and 46a of the first and second main molds 44 and 46, and the other first slide mold 48b is assembled together with the other set of the mold end portions 44b and 46b of the first and second main molds 44 and 46, thereby closing the primary mold 34. At this time, the first shaft portions 58 of the first slide molds 48a and 48b are inserted to the center of the intermediate molded body 40 in the axial direction and face each other.

As shown in FIG. 1, the secondary mold 36 includes the first and second main molds 44 and 46, a pair of second slide molds 64a and 64b, and a pair of first and second core molds 66 and 68. The first and second main molds 44 and 46 of the secondary mold 36 are also the first and second main molds 44 and 46 of the primary mold 34.

The second slide molds 64a and 64b are closed respectively against the tube end surfaces 14a and 14b of the cylindrical portion 14 in the intermediate molded body 40. The second slide molds 64a and 64b form the second annular wall portions 18 for the intermediate molded body 40. The second slide mold 64a faces one set of the mold end portions 44a and 46a of the first and second main molds 44 and 46. The second slide mold 64b faces the other set of the mold end portions 44b and 46b of the first and second main molds 44 and 46.

The second slide molds 64a and 64b each include a second cover portion 70, a second shaft portion 72 protruding from the second cover portion 70, and a second recessed portion 74. The second cover portion 70 is shaped as a circular plate. The second cover portions 70 are arranged to cover the mold end portions 44a and 46a and the mold end portions 44b and 46b of the first and second main molds 44 and 46. The diameters of the second cover portions 70 are substantially the same as the diameters of the first cover portions 56 of the first slide molds 48a and 48b.

The second cover portions 70 include respective second cover end portions 76 that are protrusions which face the mold end portions 44a and 44b of the first main mold 44 respectively and face the mold end portions 46a and 46b of the second main mold 46 respectively. Each second cover end portion 76 is annular and forms an outer edge portion of the second cover portion 70. The second cover end portion 76 has a flat surface that is orthogonal to the axial line of the second cover portion 70. In the secondary molding, when the first and second main molds 44 and 46 and the second slide molds 64a and 64b are closed, one second cover end portion 76 and the mold end portions 44a and 46a of the first and second main molds 44 and 46 move away from each other in the axial direction and the other second cover end portion 76 and the mold end portions 44b and 46b move away from each other in the axial direction. The side surface of the second cover end portion 76 contacts the first and second core molds 66 and 68, which are described further below.

Each second cover portion 70 includes a second runner 78 through which the melted resin R is supplied. The second runner 78 penetrates through the second cover portion 70 in the axial direction. The second runner 78 and the resin supplying apparatus 38 are connected to each other via the pipe 42. By supplying the melted resin R from the resin supplying apparatus 38 to the second runner 78, the resin R is supplied to the inside of the second recessed portion 74 forming the second cavity C2.

The second shaft portion 72 is arranged so as to be centered on the axis of the second cover portion 70. The second shaft portion 72 protrudes from the second cover end portion 76 along the axial direction. The cross-sectional shape of the second shaft portion 72 is circular. The diameter of the second shaft portion 72 is substantially the same as the diameters of the first shaft portions 58 of the first slide molds 48a and 48b. In the secondary molding, when the first and second main molds 44 and 46 and the second slide molds 64a and 64b are closed, the second shaft portions 72 are inserted through the through-hole 22 of the intermediate molded body 40. At this time, the second shaft portions 72 are inserted to the center of the intermediate molded body 40 in the axial direction.

The second recessed portion 74 has an annular shape arranged between the inner circumferential surface of the second cover end portion 76 and the second shaft portion 72. The second recessed portion 74 is depressed in the axial direction from an end surface of the second cover end portion 76. The second recessed portion 74 includes an end insertion portion 80 and a second wall molding portion 82. The end insertion portion 80 is annular and is arranged radially outward from the second shaft portion 72. When performing the secondary molding with the secondary mold 36, the tube end portions 26a and 26b of the intermediate molded body 40 are inserted into the end insertion portions 80.

The second wall molding portion 82 is annular and is arranged radially outward from the end insertion portion 80. The inner circumferential surface of the second wall molding portion 82 is an inclined surface that is inclined radially inward, in a direction away from the side wall surface 16a of the second cover end portion 76. The second annular wall portion 18 is molded by the second wall molding portion 82.

The first and second core molds 66 and 68 have substantially symmetrical shapes, and sandwich the axis of the resin molded product 12 and intermediate molded body 40. The first core mold 66 and the second core mold 68 are arranged symmetrically about the axis of the intermediate molded body 40. The first core mold 66 is arranged near the first main mold 44. The second core mold 68 is arranged near the second main mold 46.

The first core mold 66 and the second core mold 68 are arranged in a manner to be capable of moving toward and away from the first and second main molds 44 and 46 (cylindrical portion 14), due to a displacement mechanism (not shown), in directions (arrow B directions) orthogonal to the axis of the first and second main molds 44 and 46. The first core mold 66 and the second core mold 68 are arranged in a manner to be capable of moving toward and away from each other while sandwiching the intermediate molded body 40. The movement directions of the first and second core molds 66 and 68 are directions orthogonal to the axis of the first and second main molds 44 and 46 and the intermediate molded body 40.

The first and second core molds 66 and 68 each include a pair of core bodies 84a and 84b. The core bodies 84a and 84b are each a halved body made by halving a circular annular body. The one core body 84*a* and the other core body 84*b* are separated from each other in the axial direction (arrow A direction) of the first and second core molds 66 and 68. The pair of core bodies 84*a* and 84*b* are parallel to each other, and orthogonal to the axis of the first and second core molds 66 and 68. The one core body 84*a* and the other core body 84*b* are connected to each other by a frame 86.

When performing the secondary molding with the secondary mold 36, the first core mold 66 is attached from the outer periphery of the first main mold 44 and the second core mold 68 is attached from the outer periphery of the second main mold 46. The core bodies 84*a* and 84*b* of the first core mold 66 are inserted between the mold end portions 44*a* and 44*b* of the first main mold 44 and the second cover end portions 76 of the second slide molds 64*a* and 64*b*. The core bodies 84*a* and 84*b* of the first core mold 66 are disposed adjacent to the side wall surfaces 16*a* of the first annular wall portions 16 of the intermediate molded body 40.

The core bodies 84*a* and 84*b* of the second core mold 68 are inserted between the mold end portions 46*a* and 46*b* of the second main mold 46 and the second cover end portions 76 of the second slide molds 64*a* and 64*b*. The core bodies 84*a* and 84*b* of the second core mold 68 are disposed adjacent to and facing the side wall surfaces 16*a* of the first annular wall portions 16 of the intermediate molded body 40.

The following describes a case of injection-molding the resin molded product 12 with the injection molding apparatus 10.

First, the primary molding (first molding step) is performed to form the intermediate molded body 40 that will serve as a base for the resin molded product 12, with the primary mold 34. In the first molding step shown in FIG. 3, the first and second main molds 44 and 46 forming the primary mold 34 are closed together in a direction (arrow B direction) that is orthogonal to the axis, by a displacement mechanism (not shown). The pair of first slide molds 48*a* and 48*b* are moved toward each other along the axial direction of the first and second main molds 44 and 46, to be closed together. The mold end portions 44*a* and 44*b* of the first main mold 44 and the mold end portions 46*a* and 46*b* of the second main mold 46 are covered by the pair of first slide molds 48*a* and 48*b*. The first cavity C1, which is surrounded by the first and second main molds 44 and 46 and the first slide molds 48*a* and 48*b*, is formed inside the primary mold 34.

As shown in FIG. 4, the melted resin R is supplied from the resin supplying apparatus 38 to the first runner 54, through the pipe 42. The resin R passes from the first runner 54 through the inside of the first main mold 44, to fill the first cavity C1. The resin R cools and hardens inside the first cavity C1, thereby forming the intermediate molded body inside the first cavity C1. The intermediate molded body 40 includes the cylindrical portion 14, which has the tube body 24 and the tube end portions 26*a* and 26*b*, and the first annular wall portions 16 formed on the outer circumferential surface 24*a* of the cylindrical portion 14.

Specifically, the tube body 24 of the cylindrical portion 14 in the intermediate molded body 40 is formed between the first wall molding portions 52 of the first and second main molds 44 and 46 and the first shaft portions 58 of the first slide molds 48*a* and 48*b*. The outer circumferential walls and wall surfaces 16*b* of the first annular wall portions 16 of the intermediate molded body 40 are formed between the first wall molding portions 52 of the first and second main molds 44 and 46 and the first cover end portions 60 of the first slide molds 48*a* and 48*b*. The tube end portions 26*a* and

26*b* of the intermediate molded body 40 are formed between the first shaft portions 58, the first cover end portions 60, and first recessed portions 62. The side wall surfaces 16*a* of the first annular wall portions 16 of the intermediate molded body 40 are formed by the first cover end portions 60 of the first slide molds 48*a* and 48*b*.

Figure 6:
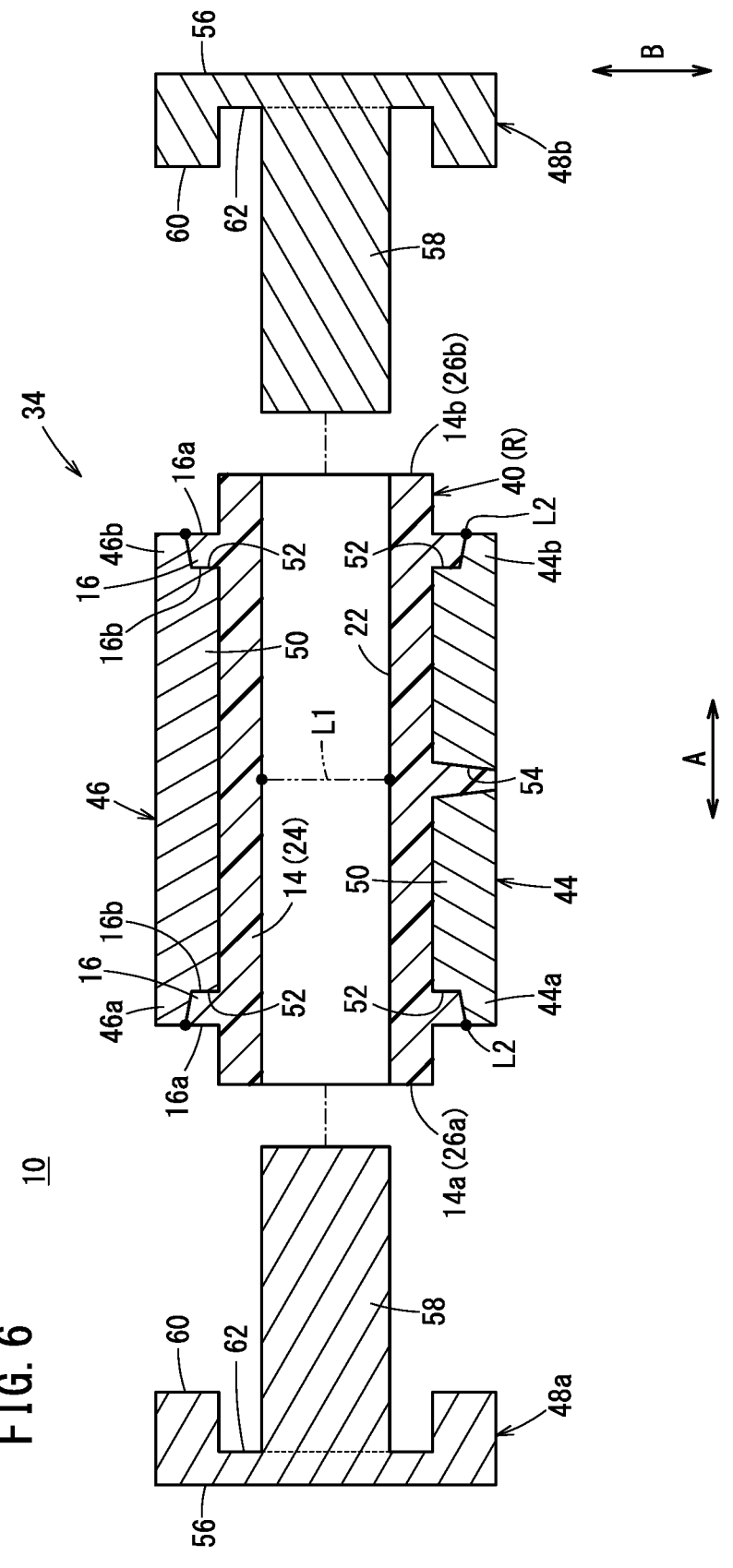
FIG. 6 is a configurational diagram showing a detachment step in which first slide molds are detached, after an intermediate molded body has been molded in the first molding step.

After completion of the formation of the intermediate molded body 40 in the first molding step shown in FIG. 4, a detachment step of opening and detaching the first slide molds 48*a* and 48*b* is performed, as shown in FIG. 6.

Specifically, the pair of first slide molds 48*a* and 48*b* are moved in directions away from the first and second main molds 44 and 46. The first cover portions 56 of the first slide molds 48*a* and 48*b* are moved away respectively from the first and second main molds 44 and 46. The first shaft portions 58 of the first slide molds 48*a* and 48*b* are removed from the through-hole 22 of the intermediate molded body 40. At this time, the first and second main molds 44 and 46 form a part of the secondary mold 36 to be used in the following second molding step, and therefore the first and second main molds 44 and 46 remain attached to the first annular wall portions 16 and tube body 24 of the intermediate molded body 40 on the radially outward side.

When the pair of first slide molds 48*a* and 48*b* are moved away in the axial direction, the tube end portions 26*a* and 26*b* of the intermediate molded body 40 and the side wall surfaces 16*a* of the first annular wall portions 16 are exposed to the outside. At this time, a first mold parting line L1 is formed, due to the first molding step, on the inner circumferential surface of the through-hole 22, between the first shaft portion 58 of the one first slide mold 48*a* and the first shaft portion 58 of the other first slide mold 48*b*. The first mold parting line L1 is annular along the inner circumferential surface of the through-hole 22.

A second mold parting line L2 is formed on the outer circumferential portion of each first annular wall portion 16. The second mold parting line L2 is formed at the interface between the side wall surface 16*a* and the outer circumferential surface of the first annular wall portion 16. The second mold parting line L2 is a line formed at the location of the interface between the mold end portions 44*a*, 46*a* of the first and second main molds 44, 46 and the first cover end portion 60 of the first slide mold 48*a*, in the first molding step. The second mold parting line L2 is a line formed at the location of the interface between the mold end portions 44*b*, 46*b* of the first and second main molds 44, 46 and the first cover end portion 60 of the first slide mold 48*b*, in the first molding step. The second mold parting line L2 is annular along the outer circumferential surface of the first annular wall portion 16.

Figure 7:
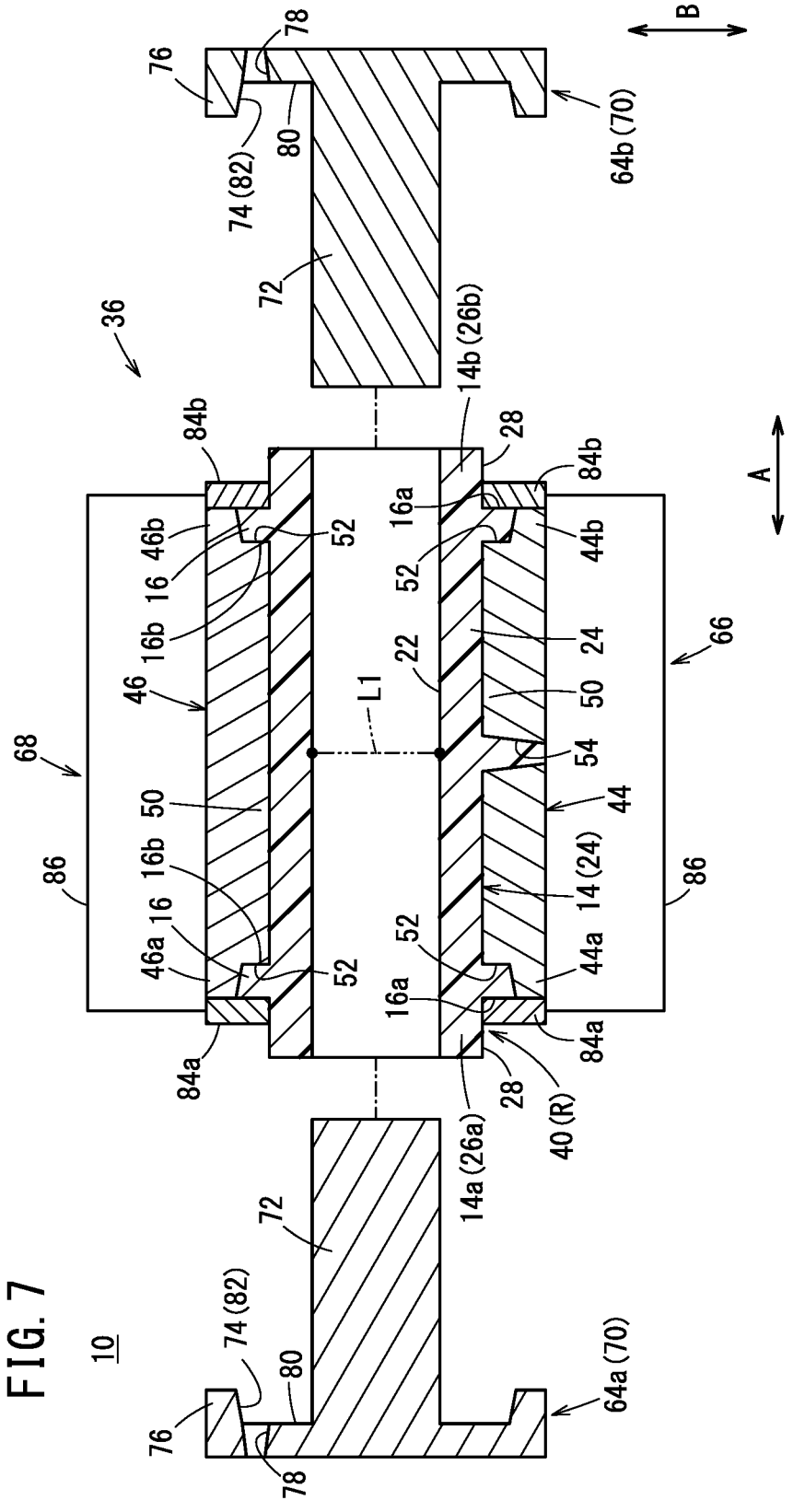
FIG. 7 is a configurational diagram showing a preparation state for a second molding step in which first and second core molds are attached to first and second main molds.

Next, the secondary molding (second molding step) is performed to form the resin molded product 12 with the intermediate molded body 40 as the base, using the secondary mold 36. In a preparation step for the second molding step shown in FIG. 7, the first and second core molds 66 and 68 are attached to the first and second main molds 44 and 46 and closed. From the state where the first core mold 66 and the second core mold 68 are open, the first core mold 66 and the second core mold 68 are moved by the displacement mechanism (not shown) toward the intermediate molded body 40 in a manner to approach each other. The movement directions of the first and second core molds 66 and 68 are directions (arrow B directions) orthogonal to the axis of the intermediate molded body 40. The core bodies 84*a* and 84*b* of the first and second core molds 66 and 68 are inserted from the radially outward side into the axially outer portions of the first annular wall portions 16 of the intermediate molded body 40. Each core body 84*a* and 84*b* is arranged adjacent to the side wall surface 16*a* of the first annular wall portion 16.

Figure 8:
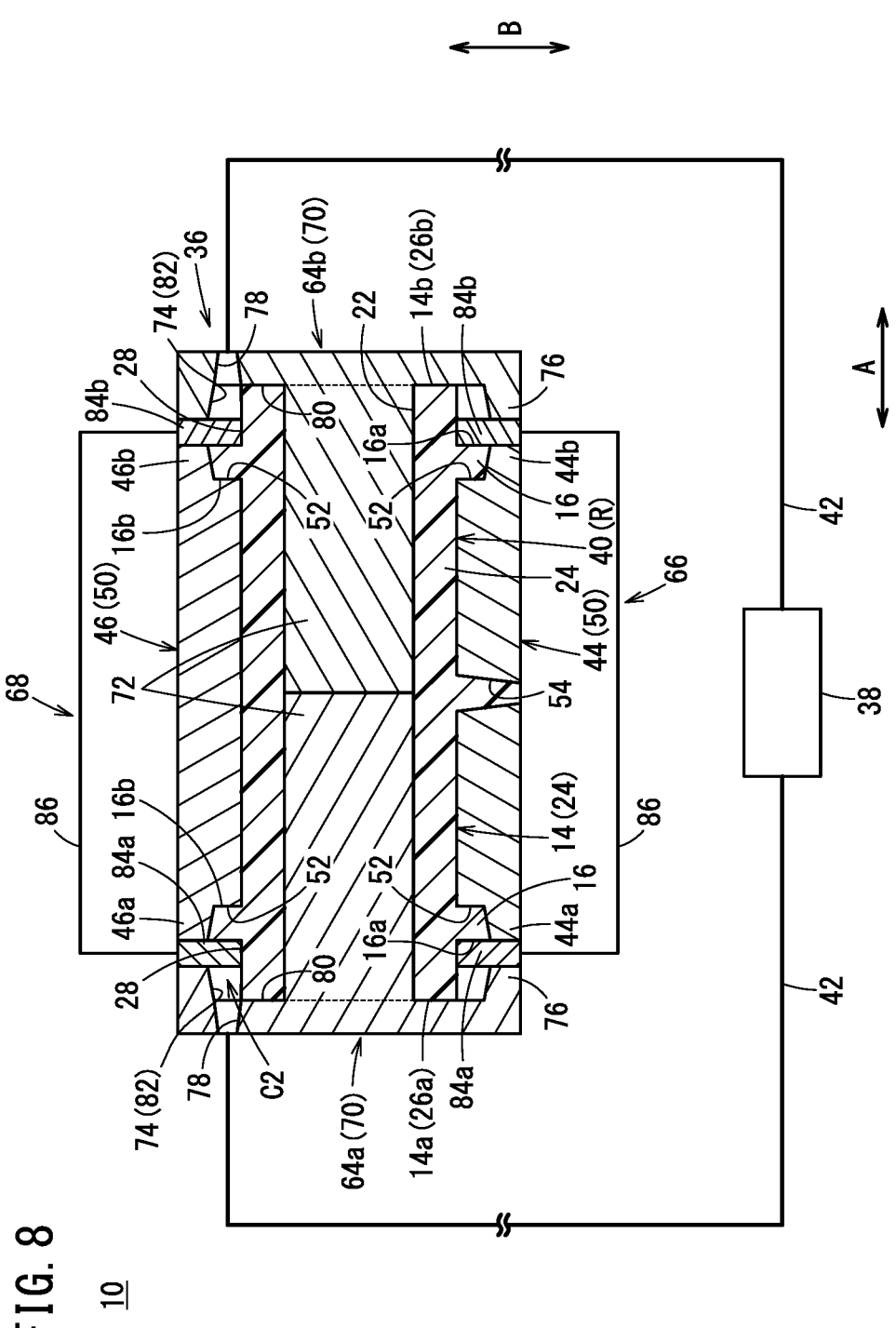
FIG. 8 is a configurational diagram showing a secondary-mold closed state in which second slide molds are attached to the injection molding apparatus of FIG. 7.

Next, as shown in FIG. 8, the molds are closed by attaching the second slide mold 64*a* to the mold end portion 44*a* of the first main mold 44 and the mold end portion 46*a* of the second main mold 46 and attaching the second slide mold 64*b* to the mold end portion 44*b* of the first main mold 44 and the mold end portion 46*b* of the second main mold 46. At this time, the second shaft portions 72 of the second slide molds 64*a* and 64*b* are inserted into the through-hole 22 of the intermediate molded body 40 and held in the through-hole 22. Due to this, the second slide molds 64*a* and 64*b* are positionally fixed to be coaxial with the intermediate molded body 40.

The second slide molds 64*a* and 64*b* are positionally fixed in the axial direction relative to the intermediate molded body 40, by abutting against the tube end portions 26*a* and 26*b* of the intermediate molded body 40. At this time, the second cover end portions 76 abut against and face the core bodies 84*a* and 84*b* of the first and second core molds 66 and 68. The second cover end portions 76 and the mold end portions 44*a*, 44*b*, 46*a*, and 46*b* of the first and second main molds 44 and 46 are separated from each other in the axial direction of the intermediate molded body 40, with the core bodies 84*a* and 84*b* therebetween. The second recessed portions 74 face the side wall surfaces 16*a* of the first annular wall portions 16 of the intermediate molded body 40. The tube end portions 26*a* and 26*b* of the intermediate molded body 40 are inserted into the end insertion portions 80 of the second recessed portions 74.

Due to this, the annular second cavities C2 are formed from the second wall molding portions 82 of the second recessed portions 74, between the second cover end portions 76 of the second slide molds 64*a*, 64*b* and the core bodies 84*a*, 84*b* of the first and second core molds 66, 68. The second cavities C2 are arranged radially outward of the respective tube end portions 26*a* and 26*b* of the intermediate molded body 40.

As shown in FIG. 1, the melted resin R is supplied from the resin supplying apparatus 38 to each of the second runners 78 of the respective second slide molds 64*a* and 64*b*, through the pipe 42. The resin R fills the inside of each of the second wall molding portions 82 of the second recessed portions 74, which is the second cavity C2, from the second runners 78. The resin R cools and hardens inside the second cavities C2, thereby forming the annular second annular wall portions 18 on the outer circumference of the tube end portions 26*a* and 26*b* inside the second cavities C2. The second annular wall portions 18 are formed integrally and connected to the outer circumferential surfaces 28 of the tube end portions 26*a* and 26*b*. The second annular wall portions 18 are formed so as to have an annular shape protruding radially outward from the outer circumferential surfaces 28 of the tube end portions 26*a* and 26*b*. The second annular wall portions 18 are formed at positions distanced outward in the axial direction (arrow A directions) from the side wall surfaces 16*a* of the first annular wall portions 16, due to the core bodies 84*a* and 84*b*.

Due to this, the annular groove portions 20 are formed radially outward from the outer circumferential surfaces 28 of the tube end portions 26*a* and 26*b*, between the first annular wall portions 16 and the second annular wall portions 18. In the second molding step, the pair of second annular wall portions 18 are molded onto the tube end portions 26*a* and 26*b* of the intermediate molded body 40, thereby forming the resin molded product 12.

Figure 9:
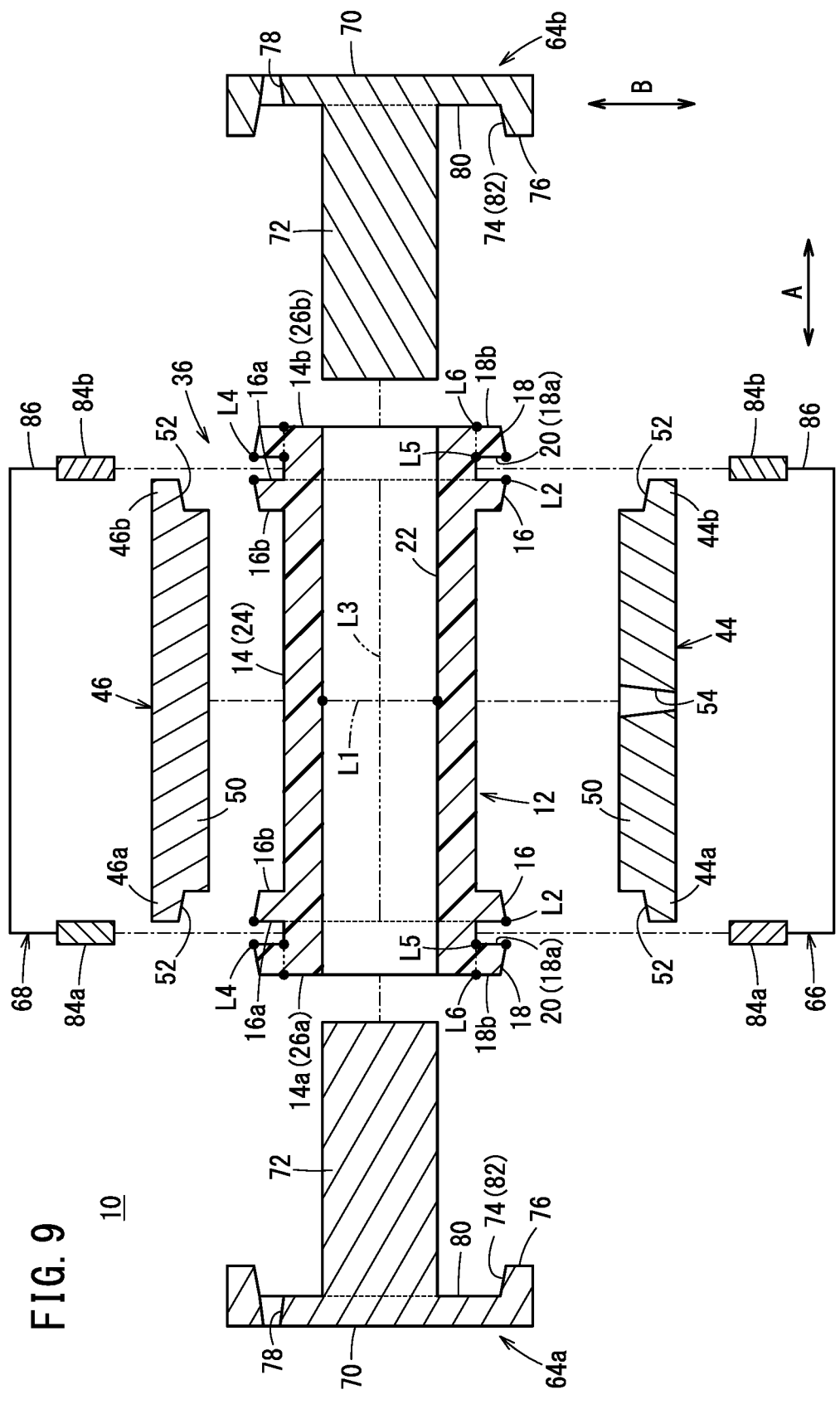
FIG. 9 is a configurational diagram showing a state in which the second molding step has ended and the molds are opened to remove the resin molded product.

As shown in FIG. 9, the opening process is performed to extract the resin molded product 12 from the secondary mold 36.

The first and second main molds 44 and 46 are moved away from the resin molded product 12. The pair of second slide molds 64*a* and 64*b* are separated from the first and second main molds 44 and 46. The second cover portions 70 of the second slide molds 64*a* and 64*b* are separated from the first and second main molds 44 and 46. The second shaft portions 72 of the second slide molds 64*a* and 64*b* are removed from the through-hole 22 of the resin molded product 12.

The first core mold 66 and the second core mold 68 are moved away from each other, in directions orthogonal to the axis of the resin molded product 12. The core bodies 84*a* and 84*b* of the first and second core molds 66 and 68 are moved radially outward away from the annular groove portions 20. The first main mold 44 and the second main mold 46 are moved away from each other, in directions orthogonal to the axis of the resin molded product 12. The first and second main molds 44 and 46 are moved radially outward away from the cylindrical portion 14 and first annular wall portions 16 of the resin molded product 12. Due to this, the resin molded product 12 is removed from the secondary mold 36.

Figure 2:
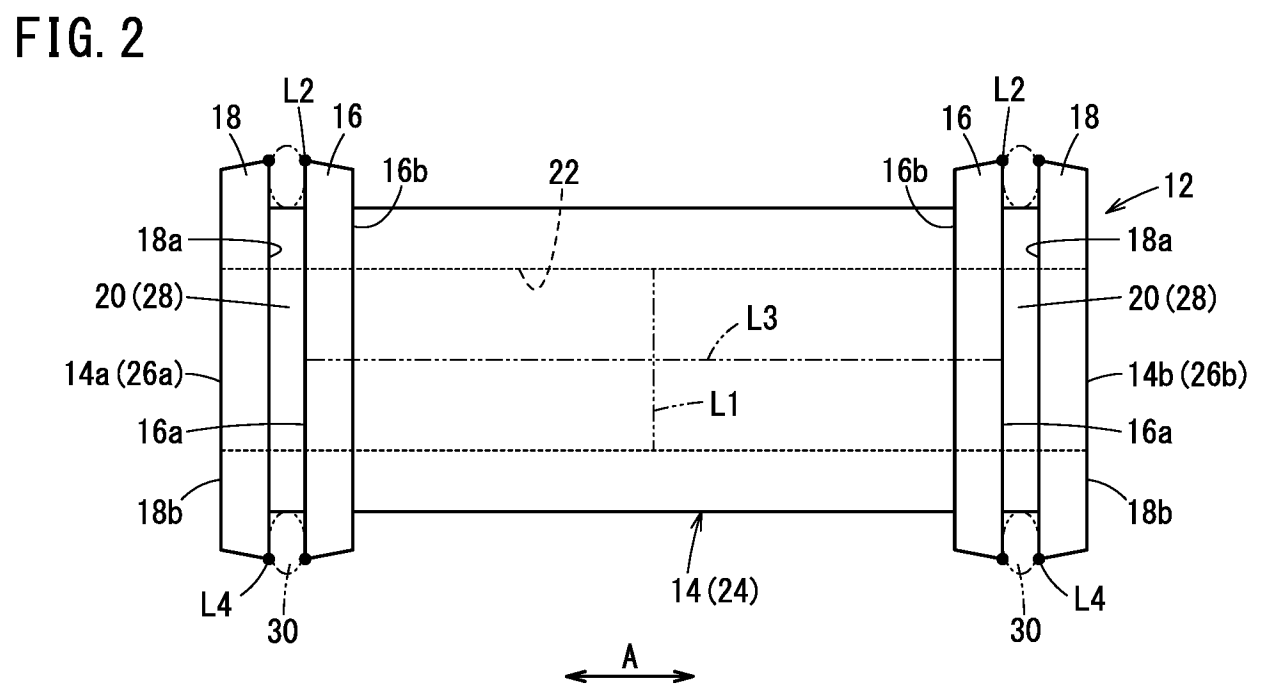

As shown in FIG. 2, a third mold parting line L3 is formed on the resin molded product 12 at a location parting the first main mold 44 and second main mold 46. The third mold parting line L3 extends linearly on the outer circumferential surface of the tube body 24 in the cylindrical portion 14, along the axial direction thereof up to the side wall surfaces 16*a* of the first annular wall portions 16. Two third mold parting lines L3 are formed at positions symmetrical to the axis of the resin molded product 12.

A fourth mold parting line L4 is formed on the outer circumferential portion of each second annular wall portion 18. The fourth mold parting line L4 is formed at the interface between the outer circumferential surface of the second annular wall portion 18 and the wall surface of the second annular wall portion 18 that faces toward the tube body 24. The fourth mold parting line L4 is a line formed at a location of each of the interface between the second cover end portion 76 of the second slide mold 64*a* and the core bodies 84*a* and the interface between the second cover end portion 76 of the second slide mold 64*b* and the core bodies 84*b*, in the second molding step. The fourth mold parting line L4 has an annular shape along the outer circumferential surface of the second annular wall portion 18.

A fifth mold parting line L5 is formed on the inner circumferential portion of each second annular wall portion 18.

The fifth mold parting line L5 is formed at the interface between the inner wall surface 18*a* of the second annular wall portion 18 facing the first annular wall portion 16 and the outer circumferential surface 28 of the tube end portion 26*a*, 26*b*. The fifth mold parting line L5 is an annular line formed at a location of the boundary between each of the inner circumferential surfaces of the core bodies 84*a* and 84*b* of the first and second core molds 66 and 68 and the corresponding one of the second wall molding portions 82 of the second slide molds 64*a* and 64*b*, in the second molding step.

A sixth mold parting line L6 is formed on the axial end surface 18*b* of each second annular wall portion 18. The sixth mold parting line L6 is formed at the location of an interface between each of the outer circumferential surfaces 28 of the tube end portions 26*a* and 26*b* and the corresponding one of the second wall molding portions 82 of the second slide molds 64a and 64b. The sixth mold parting line L6 is an annular line that is formed at the location of the interfaces between each of the outer circumferential surfaces 28 of the tube end portions 26a and 26b and the corresponding second annular wall portion 18.

No mold parting line extending in the axial direction is formed on each annular groove portion 20 of the resin molded product 12. In the first molding step for forming the intermediate molded body 40, the first cover end portions 60 of the first slide molds 48a and 48b are annular, and therefore a mold parting line extending in the axial direction is not formed on each of the outer circumferential surfaces 28 of the tube end portions 26a and 26b forming the annular groove portions 20. In the second molding step for forming the resin molded product 12, the core bodies 84a and 84b of the first and second core molds 66 and 68 are arranged adjacent to the side wall surfaces 16a of the first annular wall portions 16, and therefore the inflow of the resin R into the annular groove portions is prevented and a mold parting line extending in the axial direction is not formed on each annular groove portion 20. The fifth mold parting line L5 is formed on the annular groove portion 20, but the fifth mold parting line L5 is annular and does not extend in the axial direction of the annular groove portion 20. The fifth mold parting line L5 is formed at a corner portion of the annular groove portion 20 adjacent to the inner wall surface 18a of the second annular wall portion 18. That is, the resin molded product 12 has the annular groove portion 20 surrounded by the first and second annular wall portions 16 and 18, and a mold parting line is not formed along the axial direction on each of the outer circumferential surfaces 28 of the tube end portions 26a and 26b serving as the bottom surfaces of the annular groove portions 20.

The resin molded product 12 is not limited to including the first and second annular wall portions 16 and 18 (annular groove portion 20) at each of the one end side and other end side of the cylindrical portion 14 in the axial direction. The resin molded product 12 may have a structure in which the first and second annular wall portions 16 and 18 (annular groove portion 20) are included at only one of the one end side and the other end side of the cylindrical portion 14. In such a case, in the primary molding, one first slide mold 48a (or 48b) may be closed at the one end side or the other end side of the first and second main molds 44 and 46 to form the intermediate molded body 40 including one set of the first and second annular wall portions 16 and 18, and in the secondary molding, one second slide mold 64a (or 64b) may be closed at the one end side or the other end side of the first and second main molds 44 and 46 to form one annular groove portion 20, thereby forming the resin molded product 12 that includes one each of the first and second annular wall portions 16 and 18 (annular groove portion 20).

In this way, in the embodiment of the present invention, when performing the injection molding of the tubular resin molded product 12, after performing the first molding step to form the intermediate molded body 40 that has the first annular wall portions 16 and the tube body 24 of the cylindrical portion 14, the second slide molds 64a and 64b are closed onto the intermediate molded body 40 in the axial direction to form the second annular wall portions 18 on the outer circumferential surface 28 of the cylindrical portion 14, in the second molding step. Due to this, a mold parting line extending in the axial direction due to molding is prevented from being formed on the annular groove portion 20 between the first annular wall portion 16 and the second annular wall portion 18 in the resin molded product 12. Therefore, after the resin molded product 12 has been formed, there is no need to remove the mold parting line on the annular groove portion through additional machining, and so it is possible to reduce the number of manufacturing steps and the manufacturing cost.

In the first molding step for forming the intermediate molded body 40, the resin R is supplied to the inside of the first cavity C1 from the first runner 54 of the first main mold 44 among the first and second main molds 44 and 46, thereby making it possible to form the intermediate molded body 40 by filling the inside of the first cavity C1 with the resin R.

With the injection molding apparatus 10 for molding the resin molded product 12, when forming the intermediate molded body 40 that has the first annular wall portions 16 and the tube body 24 of the cylindrical portion 14 with the primary mold 34, the second slide molds 64a and 64b are opened in the axial direction away from the intermediate molded body 40 and the second annular wall portions 18 are formed on the cylindrical portion 14 by the second slide molds 64a and 64b of the secondary mold 36, whereby a mold parting does not occur in the radial direction on the annular groove portions 20 (outer circumferential surfaces 28 of the tube end portions 26a and 26b) between the first annular wall portions 16 and the second annular wall portions 18, and it is possible to prevent the supply of the resin R to the annular groove portions 20, due to the first and second core molds 66 and 68. Therefore, it is possible to prevent the occurrence of a mold parting line on the outer circumferential surface of the annular groove portion of the resin molded product 12.

The following is a summary of the above embodiment.

One aspect of the present invention is the injection molding method for the resin molded product, for forming the tubular resin molded product (12) by injection molding, wherein: the resin molded product includes: the cylindrical portion (14) that extends along the axial direction of the resin molded product and includes the tube end surface (14a, 14b) that is the end surface at at least one end side thereof in the axial direction; the first annular wall portion (16) that protrudes radially outward from the outer circumferential surface (24a) of the cylindrical portion at at least the one end side of the cylindrical portion, and has the side wall surface (16a) facing outward in the axial direction; the second annular wall portion (18) that protrudes radially outward from the outer circumferential surface of the cylindrical portion at at least the one end side of the cylindrical portion, and is arranged distanced outward in the axial direction from the first annular wall portion; and the annular groove portion (20) formed between the first annular wall portion and the second annular wall portion. The cylindrical portion includes the tube body (24) forming part of the cylindrical portion that extends from the side wall surface of the first annular wall portion to at least the center of the cylindrical portion in the axial direction, and the tube end portion (26a, 26b) that extends from the side wall surface to the tube end surface of the cylindrical portion and whose outer circumferential surface forms part of the annular groove portion. The injection molding method includes: the first molding step of molding the intermediate molded body (40) that includes the tube body and the first annular wall portion of the resin molded product, using the first and second main molds (44, 46) that are closed together along the direction orthogonal to the axis of the cylindrical portion and the first slide mold (48a, 48b) that is closed against at least one end surface of the first and second main molds along the axial direction of the cylindrical portion; the detachment step of, after the molding of the intermediate molded body, detaching the first slide mold from the intermediate molded body along the axial direction of the cylindrical portion; and the second molding step of molding the second annular wall portion on the outer circumferential surface of the cylindrical portion, using the second slide mold (64a, 64b) that is closed, along the axial direction, against the tube end surface of the cylindrical portion of the intermediate molded body and the first and second core molds (66, 68) that are closed in the direction orthogonal to the axis of the cylindrical portion and arranged adjacent to the side wall surface.

In the first molding step, melted resin (R) is injected into the first cavity (C1) from at least one of the first or second main mold, the first cavity being formed by the first and second main molds and the first slide mold.

The resin molded product includes the first annular wall portion, the second annular wall portion, and the annular groove portion at each of the one end side and the other end side in the axial direction of the cylindrical portion; in the first molding step, the intermediate molded body including the two first annular wall portions is molded, using the first and second main molds and the two first slide molds arranged at respective both sides of the first and second molds in the axial direction; and in the second molding step, the two second annular wall portions are molded on the outer circumferential surface of the cylindrical portion, using the first and second main molds, the two second slide molds arranged at the respective both sides of the cylindrical portion in the axial direction, and the first and second core molds arranged at the respective both sides of the cylindrical portion in the axial direction.

Another aspect of the present invention is the injection molding apparatus for forming the tubular resin molded product by injection molding, wherein the resin molded product includes: the cylindrical portion that extends along the axial direction of the resin molded product and includes the tube end surface that is the end surface at at least one end side thereof in the axial direction; the first annular wall portion that protrudes radially outward from the outer circumferential surface of the cylindrical portion at at least the one end side of the cylindrical portion, and has the side wall surface facing outward in the axial direction; the second annular wall portion that protrudes radially outward from the outer circumferential surface of the cylindrical portion at at least the one end side of the cylindrical portion, and is arranged distanced outward in the axial direction from the first annular wall portion; and the annular groove portion formed between the first annular wall portion and the second annular wall portion. The cylindrical portion includes the tube body forming part of the cylindrical portion that extends from the side wall surface of the first annular wall portion to at least the center of the cylindrical portion in the axial direction, and the tube end portion that extends from the side wall surface to the tube end surface of the cylindrical portion and whose outer circumferential surface forms part of the annular groove portion. The injection molding apparatus includes: the primary mold (34) that includes therein the first cavity and molds the intermediate molded body having the cylindrical portion and the first annular wall portion of the resin molded product; and the secondary mold (36) that includes therein the second cavity (C2) and molds the second annular wall portion on the outer circumferential surface of the cylindrical portion of the intermediate molded body. The primary mold includes: the first and second main molds that are closed together in the direction orthogonal to the axis of the cylindrical portion, to mold the outer circumferential surface of the tube body, the outer circumferential surface of the first annular wall portion, and the wall surface (16b) of the first annular wall portion that connects the outer circumferential surface of the tube body and the outer circumferential surface of the first annular wall portion; and the first slide mold that is closed against at least one end surface of the first and second main molds along the axial direction of the cylindrical portion, to mold the side wall surface of the first annular wall portion and the tube end portion. The secondary mold includes: the second slide mold that is closed against the tube end surface of the cylindrical portion of the intermediate molded body, to mold the second annular wall portion; and the first and second core molds that are closed, in the direction orthogonal to the axis of the cylindrical portion, against the outer circumferential surface of the tube end portion of the intermediate molded body, and are arranged adjacent to the side wall surface of the first annular wall portion.

At least one of the first main mold or the second main mold includes the runner (54) through which melted resin is injected into the first cavity formed by the first main mold, the second main mold, and the first slide mold.

The resin molded product includes the first annular wall portion, the second annular wall portion, and the annular groove portion at each of the one end side and the other end side in the axial direction of the cylindrical portion; the primary mold molds the intermediate molded body including the two first annular wall portions, using the first and second main molds and the two first slide molds arranged at respective both sides of the first and second molds in the axial direction; and the secondary mold molds the two second annular wall portions on the outer circumferential surface of the cylindrical portion, using the first and second main molds, the two second slide molds arranged at the respective both sides of the cylindrical portion in the axial direction, and the first and second core molds arranged at the respective both sides of the cylindrical portion in the axial direction.

The present invention is not limited to the above disclosure, and various configurations can be adopted without deviating from the gist and scope of the present invention.

The invention claimed is:

1. An injection molding apparatus for forming a tubular resin molded product by injection molding, wherein:
   the resin molded product includes:
   a cylindrical portion that extends along an axial direction of the resin molded product and includes a tube end surface that is an end surface at at least one end side in the axial direction;
   a first annular wall portion that protrudes radially outward from an outer circumferential surface of the cylindrical portion at at least the one end side of the cylindrical portion, and includes a side wall surface facing outward in the axial direction;
   a second annular wall portion that protrudes radially outward from the outer circumferential surface of the cylindrical portion at at least the one end side of the cylindrical portion, and is arranged distanced outward in the axial direction from the first annular wall portion; and
   an annular groove portion formed between the first annular wall portion and the second annular wall portion;
   the cylindrical portion includes a tube body forming part of the cylindrical portion that extends from the side wall surface of the first annular wall portion to at least a center of the cylindrical portion in the axial direction, and a tube end portion that extends from the side wall surface to the tube end surface of the cylindrical portion and whose outer circumferential surface forms part of the annular groove portion, the injection molding apparatus comprising:

a primary mold that includes therein a first cavity and is configured to mold an intermediate molded body including the cylindrical portion and the first annular wall portion of the resin molded product; and a secondary mold that includes therein a second cavity and is configured to mold the second annular wall portion on the outer circumferential surface of the cylindrical portion of the intermediate molded body, wherein the primary mold includes:

first and second main molds configured to be closed together in a direction orthogonal to an axis of the cylindrical portion and to mold an outer circumferential surface of the tube body, an outer circumferential surface of the first annular wall portion, and a wall surface of the first annular wall portion that connects the outer circumferential surface of the tube body and the outer circumferential surface of the first annular wall portion; and a first slide mold configured to be closed against at least one end surface of the first and second main molds along an axial direction of the cylindrical portion and to mold the side wall surface of the first annular wall portion and the tube end portion, and the secondary mold includes:

a second slide mold including a protrusion and configured to be closed against the tube end surface of the cylindrical portion of the intermediate molded body and to mold the second annular wall portion;

first and second core molds configured to be closed, in a direction orthogonal to an axis of the cylindrical portion, against the outer circumferential surface of the tube end portion of the intermediate molded body and to be disposed adjacent to the side wall surface of the first annular wall portion, and in a closed state of the second slide mold, the protrusion of the second slide mold is brought into contact with the first and second core molds, and the first and second core molds and the second slide mold define a recessed portion configured to mold the second annular wall portion.

2. The injection molding apparatus according to claim 1, wherein:

at least one of the first main mold or the second main mold includes a runner through which melted resin is injected into the first cavity formed by the first main mold, the second main mold, and the first slide mold.

3. The injection molding apparatus according to claim 1, wherein:

the resin molded product includes the first annular wall portion, the second annular wall portion, and the annular groove portion at each of the one end side and another end side in the axial direction of the cylindrical portion;

the first slide mold comprises two first slide molds, and the primary mold is configured to mold the intermediate molded body including the two first annular wall portions, using the first and second main molds and the two first slide molds arranged at respective both sides of the first and second molds in the axial direction; and the second slide mold comprises two second slide molds, and the secondary mold is configured to mold the two second annular wall portions on the outer circumferential surface of the cylindrical portion, using the first and second main molds, the two second slide molds arranged at respective both sides of the cylindrical portion in the axial direction, and the first and second core molds arranged at respective both sides of the cylindrical portion in the axial direction.

* * * * *